(12) United States Patent
Hagano

(10) Patent No.: US 7,344,042 B2
(45) Date of Patent: Mar. 18, 2008

(54) CAP DEVICE

(75) Inventor: Hiroyuki Hagano, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 436 days.

(21) Appl. No.: 10/914,646

(22) Filed: Aug. 10, 2004

(65) Prior Publication Data

US 2005/0040170 A1 Feb. 24, 2005

(30) Foreign Application Priority Data

Aug. 11, 2003 (JP) .............................. 2003-291205
Aug. 11, 2003 (JP) .............................. 2003-291210

(51) Int. Cl.
*B65D 41/04* (2006.01)
(52) U.S. Cl. .............................. 220/288; 220/DIG. 33; 220/DIG. 32; 220/298; 220/300; 220/304
(58) Field of Classification Search ........ 220/DIG. 33, 220/DIG. 32, 288, 298, 300, 304
See application file for complete search history.

(56) References Cited

U.S. PATENT DOCUMENTS

| | | | | |
|---|---|---|---|---|
| 3,815,776 A | * | 6/1974 | MacMillan | 220/203.24 |
| 3,907,155 A | * | 9/1975 | Smith et al. | 220/210 |
| 3,986,634 A | * | 10/1976 | Smith et al. | 220/288 |
| 4,252,246 A | * | 2/1981 | Johnson et al. | 220/288 |
| 4,453,388 A | * | 6/1984 | Baker et al. | 70/165 |
| 4,527,406 A | * | 7/1985 | Baker | 70/165 |
| 4,676,390 A | * | 6/1987 | Harris | 220/203.06 |
| 4,779,755 A | * | 10/1988 | Harris | 220/203.21 |
| 4,993,578 A | * | 2/1991 | Kerby | 220/257.1 |
| 5,183,173 A | * | 2/1993 | Heckman | 220/203.07 |
| 5,449,086 A | * | 9/1995 | Harris | 220/288 |
| 5,638,975 A | * | 6/1997 | Harris | 220/288 |
| 5,720,328 A | * | 2/1998 | Ott | 141/312 |
| 5,791,507 A | * | 8/1998 | Harris et al. | 220/203.26 |
| 6,035,906 A | * | 3/2000 | Ott | 141/312 |
| 6,179,148 B1 | * | 1/2001 | Harris | 220/288 |
| 6,325,233 B1 | * | 12/2001 | Harris | 220/288 |
| 6,412,651 B2 | * | 7/2002 | Tada et al. | 220/288 |
| 6,745,914 B2 | * | 6/2004 | Hagano et al. | 220/288 |
| 6,763,966 B2 | * | 7/2004 | Harris | 220/293 |
| 6,814,251 B2 | * | 11/2004 | Hagano | 220/288 |
| 7,025,222 B2 | * | 4/2006 | Hagano et al. | 220/375 |
| 7,131,469 B2 | * | 11/2006 | Dunkle | 141/100 |
| 2002/0066734 A1 | * | 6/2002 | Harris | 220/304 |

(Continued)

FOREIGN PATENT DOCUMENTS

JP    A-2000-344266    12/2000

*Primary Examiner*—Anthony Stashick
*Assistant Examiner*—Christopher McKinley
(74) *Attorney, Agent, or Firm*—Posz Law Group, PLC

(57) ABSTRACT

A fuel cap has a torque mechanism that transmits a rotational torque to a casing main body through engagement elements in response to rotation of a cover. When the rotational torque exceeds a predetermined level, the engagement is released to give a click. The first torque arm is constructed as a cantilever beam having a free end facing an arm support member across a preset gap. Under application of pressure, the first torque arm is deformed and transmits a rotational torque in the closing direction to the casing main body. This arrangement assures setting of the rotational torque of the torque mechanism to the predetermined level to apply a sufficient sealing stress to the fuel cap.

4 Claims, 11 Drawing Sheets

U.S. PATENT DOCUMENTS

2003/0136785 A1* 7/2003 Hagano ...................... 220/288
2003/0205578 A1* 11/2003 Newport .................... 220/304
2004/0000553 A1* 1/2004 Ueki .......................... 220/293
2005/0040170 A1* 2/2005 Hagano ...................... 220/304

* cited by examiner

CAP DEVICE

This application claims the benefit of and priority from Japanese Application No. 2003-291205 filed Aug. 11, 2003 and No. 2003-291210 filed Aug. 11, 2003, the contents of which are incorporated herein by reference.

BACKGROUND OF THE INVENTION

1. Field of the Invention

The present invention relates to a cap device having a torque mechanism for sealing a tank opening with a rotational torque of a predetermined level.

2. Description of the Related Art

A known fuel cap for an automobile fuel tank is disclosed in, for example, JP No. 2000-344266A. FIG. 17 is a decomposed perspective view showing a prior art torque mechanism 130 of a conventional fuel cap 100. The fuel cap 100 of FIG. 17 mainly has a casing main body 110, a cover 120 with a handle for rotational operations, and the torque mechanism 130. The torque mechanism 130 includes a handle engagement element 122 formed on the cover 120, a torque plate 140 having cantilevered torque arms 142 with torque engagement projections 142a, and a spring 132. In the case of rotation of the cover 120 in a closing direction, a rotational torque exceeding a predetermined level releases the engagement of the handle engagement element 122 with the torque engagement projections 142a to give a click. In the case of rotation of the cover 120 in an opening direction, on the other hand, the casing main body 110 rotates integrally with the cover 120 to open the fuel cap 100.

In the closing operation of the fuel cap 100, a click is given when the handle engagement element 122 rides over the torque engagement projections 142a of the torque plate 140. This proves that the fuel cap 100 is sealed with a substantially constant rotational torque of the predetermined level, regardless of the elasticity of a gasket.

The torque plate 140 having the torque arm 142 is formed by injection molding of resin. The long torque arm 142, however, tends to have varying dimensions, due to molding strain. Even slight change of the dimensions may result in a significant variation in rotational torque in the closing direction.

SUMMARY OF THE INVENTION

The object of the invention is thus to provide a cap device having a torque mechanism that readily sets a rotational torque in a closing direction to a predetermined level.

In order to attain at least part of the above and the other related objects, the present invention is directed to a cap device that closes a tank opening and engages with an opening engagement element formed around periphery of the tank opening. The cap device comprises: a closer that closes the tank opening with air-tight sealing and has a cap engagement element engaging with the opening engagement element via rotation of the closer by a preset angle; a handle mechanism that is mounted on an upper portion of the closer in a rotatable manner to rotate the closer in a closing direction and an opening direction of the tank opening; and a torque mechanism that is interposed between the handle mechanism and the closer, the torque mechanism having (i) multiple first engagement elements arranged in a circle, (ii) a second engagement element engaging with at least one of the first engagement elements, and (iii) a third engagement element engaging with at least one of the first engagement elements, the torque mechanism being configured to transmit a rotational torque applied to the handle mechanism to the closer via engagement of the first engagement element with the second engagement element and via engagement of the first engagement element with the third engagement element. The torque mechanism is configured such that the engagement of the first engagement element with the second engagement element transmits a greater rotational torque in the closing direction than the engagement of the first engagement element with the third engagement element in response to a rotation of the handle mechanism in the closing direction, before the engagement of the first engagement element with the second engagement element is released when the rotational torque exceeds a predetermined level, and the torque mechanism is configured such that the engagement of the first engagement element with the third engagement element transmits a greater rotational torque in the opening direction than the engagement of the first engagement element with the second engagement element in response to a rotation of the handle mechanism in the opening direction.

In the cap device of the invention, the handle mechanism is rotated in the closing direction after the cap engagement element of the closer is positioned at the opening engagement element of the tank opening. The closer then integrally rotates with the handle mechanism via the torque mechanism to make the cap engagement element fit in the opening engagement element. In the torque mechanism under such conditions, the first engagement element mainly engages with the second engagement element to transmit the rotational torque applied to the handle mechanism to the closer. When the rotational torque exceeds the predetermined level by the engagement of the cap engagement element with the opening engagement element, the engagement of the first engagement element with the second engagement element is released. This clearly proves that the cap device is sealed with the rotational torque of the predetermined level. In this state, the first engagement element also engages with the third engagement element. This engagement force is, however, smaller than the engagement force in the closing direction produced by the engagement of the first engagement element with the second engagement element. The engagement of the first engagement element with the third engagement element accordingly has very little contribution to transmission of the rotational torque in the closing direction.

When a rotational torque in the opening direction is applied to the handle mechanism in the sealed state of the tank opening with the cap device, the rotational torque in the opening direction is transmitted via the engagement of the first engagement element with the third engagement element in the torque mechanism. In this state, the first engagement element also engages with the second engagement element. This engagement force is, however, smaller than the engagement force in the opening direction produced by the engagement of the first engagement element with the third engagement element. The engagement of the first engagement element with the second engagement element accordingly has very little contribution to transmission of the rotational torque in the opening direction.

Namely the engagement of the first engagement element with the second engagement element mainly covers the rotational torque applied by the handle mechanism in the closing direction, whereas the engagement of the first engagement element with the third engagement element mainly covers the rotational torque applied by the handle mechanism in the opening direction.

In the cap device of this application, the torque mechanism has the second engagement element and the third engagement element that play different roles in the closing direction and in the opening direction. The second engagement element mainly covers the rotational torque in the closing direction, whereas the third engagement element mainly covers the rotational torque in the opening direction. The required rotational toque is thus readily set to the predetermined level by practically taking into account only the release of the engagement of the first engagement element with the second engagement element. The third engagement element mainly covers the rotational torque in the opening direction and prevents a significantly large load in the opening direction from being applied to the second engagement element. This arrangement desirably enhances the durability of the second engagement element. The structure of the invention does not require the engagement elements of an identical shape to fulfill the two contradictory parameters, that is, setting of the load for release of the engagement and setting of the mechanical strength. The structure of the invention uses the engagement elements of different shapes and thereby enables the load for release of the engagement and the mechanical strength to be set to respective adequate levels.

One preferable embodiment of the torque mechanism has a torque plate that is held between the handle mechanism and the closer in a freely rotatable manner. The second engagement element is protruded from an outer circumference of the torque plate. The third engagement element is protruded from the outer circumference of the torque plate and is located to have a predetermined angle in the circumferential direction with the second engagement element.

In one preferable structure of the torque plate with the second engagement element and the third engagement element, the second engagement element is a first torque arm that is constructed as an arch-shaped cantilever beam and has a torque engagement projection. The first torque arm is deformed in a direction perpendicular to a longitudinal axis of the cantilever beam at a two-point support of a support base and a free end of the first torque arm under application of pressure from the first engagement element to the torque engagement projection. The third engagement element is a second torque arm that is constructed as a cantilever beam and has an engagement end. The second torque arm is inclined at a one-point support of a base of the second torque arm under application of pressure from the first engagement element to the engagement end.

One preferable embodiment of the handle mechanism has a cover surrounding the upper portion of the closer and a handle mounted on the cover. The first engagement element has multiple handle engagement elements arranged on a circumference of the cover to face the closer.

In the cap device of the invention having another arrangement, the present invention is directed to a cap device that closes a tank opening and engages with an opening engagement element formed around periphery of the tank opening. The cap device includes: a closer that seals the tank opening and has a cap engagement element, which is caught by the opening engagement element when the closer is rotated by a preset angle; a handle mechanism that is attached to an upper portion of the closer in a rotatable manner to rotate the closer in either of a closing direction and an opening direction of the tank opening; and a torque mechanism that is interposed between the handle mechanism and the closer, has a first engagement element and a second engagement element, which engages with the first engagement element, and transmits a rotational torque applied to the handle mechanism to the closer via engagement of the first engagement element with the second engagement element. The second engagement element is a torque arm having an arm support member, an arm main body that is protruded from the arm support member and is structured as a cantilever beam with a free end arranged to face the arm support member across a preset gap, and a torque engagement projection that is protruded from the arm main body to engage with the first engagement element. In response to rotation of the handle mechanism in the closing direction to engage the first engagement element with the torque engagement projection, the torque arm is deformed in a direction perpendicular to a longitudinal axis of the torque arm at a two-point support where the free end is in contact with the arm support member, and transmits a rotational torque in the closing direction to the closer. The engagement of the first engagement element with the torque engagement projection is released not to transmit the rotational torque to the closer when the rotational torque exceeds a predetermined level.

In the cap device of the invention, the handle mechanism is rotated in the closing direction after the cap engagement element of the closer is positioned at the opening engagement element of the tank opening. The closer then integrally rotates with the handle mechanism via the torque mechanism to make the cap engagement element fit in the opening engagement element. In the torque mechanism under such conditions, the first engagement element engages with the second engagement element of the torque arm. The torque arm is pressed by the first engagement element to fall into the two-point support state with no gap between the free end and the arm support member. In this state, the torque arm is deformed in the direction perpendicular to the longitudinal axis of the torque arm and transmits the rotational torque applied to the handle mechanism to the closer. When the rotational torque exceeds a predetermined level with an increase in reactive force against the engagement of the cap engagement element with the opening engagement element, the engagement of the first engagement element with the second engagement element is released. This clearly proves that the cap device is sealed with the rotational torque of the predetermined level.

The rotational torque to be transmitted is set by taking into account the required force to elastically deform the torque arm in the direction perpendicular to its longitudinal axis at the two-point support where the free end of the torque arm is in contact with the arm support member and release the engagement of the first engagement element with the second engagement element. The rotational torque is set to a predetermined level, regardless of the varying gap between the free end of the torque arm and the arm support member. Namely the rotational torque under release of the engagement does not depend upon the gap between the free end of the torque arm and the arm support member. The rotational torque under release of the engagement can thus be set to the predetermined level, regardless of the varying dimensions of the torque arm.

One preferable embodiment of the torque mechanism has a torque plate that is held between the handle mechanism and the closer in a freely rotatable manner. The torque arm is protruded from an outer circumference of the torque plate.

One preferable embodiment of the handle mechanism has a cover surrounding the upper portion of the closer and a handle mounted on the cover. The first engagement element has multiple handle engagement elements arranged on a circumference of the cover to face the closer.

One preferable embodiment of the torque arm has a chamfered portion at its free end that comes into contact with the arm support member. The chamfered portion of the free end thus comes into contact with and is slid on the arm support member, when the torque arm is elastically deformed. This structure ensures smooth elastic deformation of the torque arms.

These and other objects, features, aspects, and advantages of the present invention will become more apparent from the following detailed description of the preferred embodiment with the accompanied drawings.

DESCRIPTION OF THE PREFERRED EMBODIMENTS

One mode of carrying out the invention is discussed below as a preferred embodiment.

(1) General Structure of Fuel Cap 10

Figure 1:
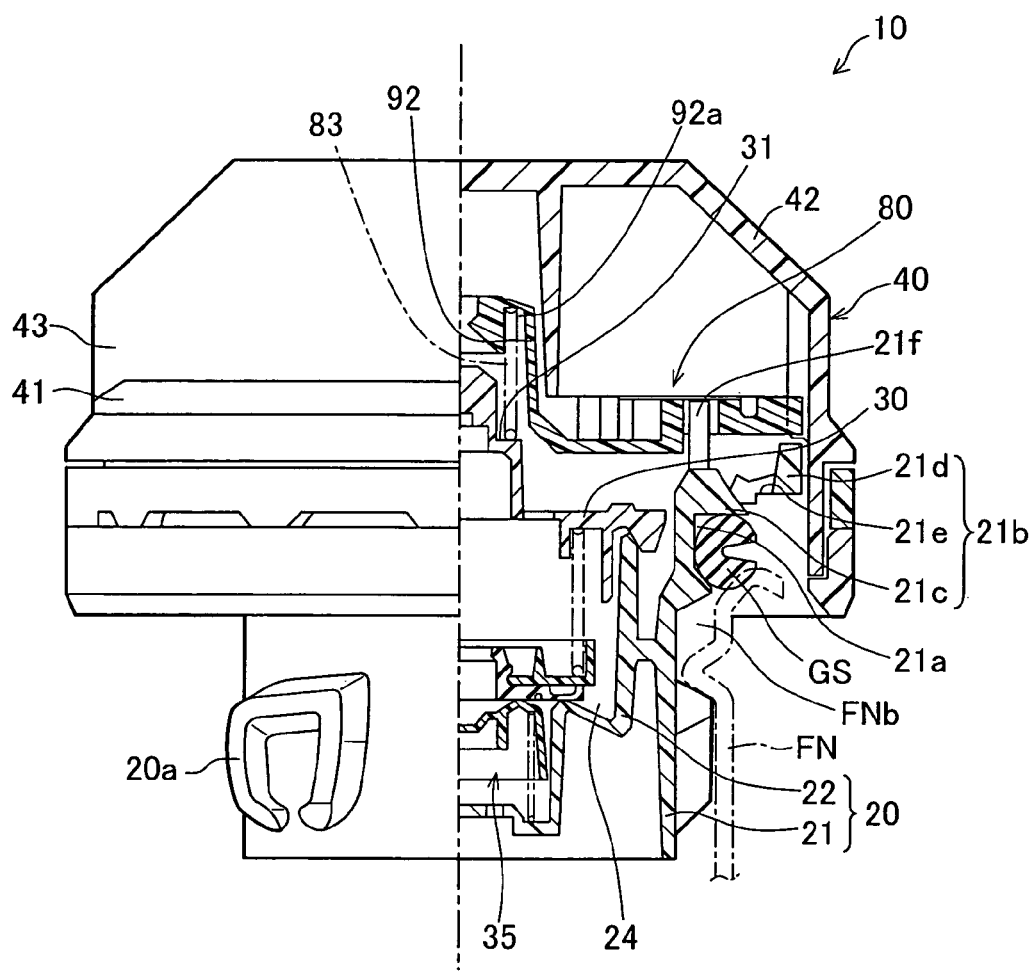
FIG. 1 is a half sectional view showing a fuel cap in one embodiment of the invention.

FIG. 1 is a half sectional view showing a fuel cap 10 (cap device) in one embodiment of the invention. The fuel cap 10 is attached to a filler neck FN having a fueling inlet FNb (tank opening) to feed a supply of fuel to a fuel tank (not shown). The fuel cap 10 has a casing main body 20 (closer) that is made of a synthetic resin material like polyacetal, a cover 40 that is mounted on the casing main body 20 and has a handle made of a synthetic resin material like nylon, an inner cover 30 that closes an upper opening of the casing main body 20 and forms a valve chest 24, a pressure regulating valve 35 that is received in the valve chest 24, a torque mechanism 80, and a gasket GS that is attached to the upper outer circumference of the casing main body 20 to seal the casing main body 20 against the filler neck FN.

(2) Construction of Constituents of Fuel Cap 10

The construction of the respective constituents of the fuel cap 10 in the embodiment is discussed below in detail.

(2)-1 Structure of Casing Main Body 20

The casing main body 20 has a substantially cylindrical outer tubular body 21 with a casing engagement element 20a (cap engagement element), which is caught by the inner circumference of the filler neck FN, and a valve chest-formation member 22 that is located inside the outer tubular body 21. The valve chest-formation member 22 receives a positive pressure valve and a negative pressure valve functioning as the pressure regulating valve 35 therein. The inner cover 30 is welded to the upper portion of the valve chest-formation member 22 by the ultrasonic welding technique to cover over the valve chest 24.

The gasket GS is set on a lower face of an upper flange 21b of the casing main body 20. The gasket GS is located between a seal support element 21a of the flange 21b and the fueling inlet FNb of the filler neck FN. When the fuel cap 10 is inserted into the fueling inlet FNb, the gasket GS is pressed against the seal support element 21a to exert the sealing effects.

Figure 2:
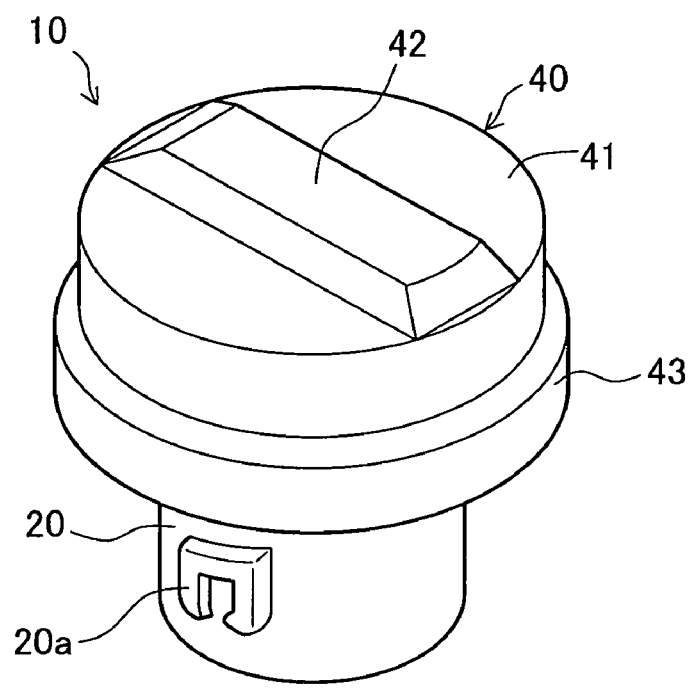
FIG. 2 shows a casing engagement element of a casing main body and a filler neck FN.
Figure 2:
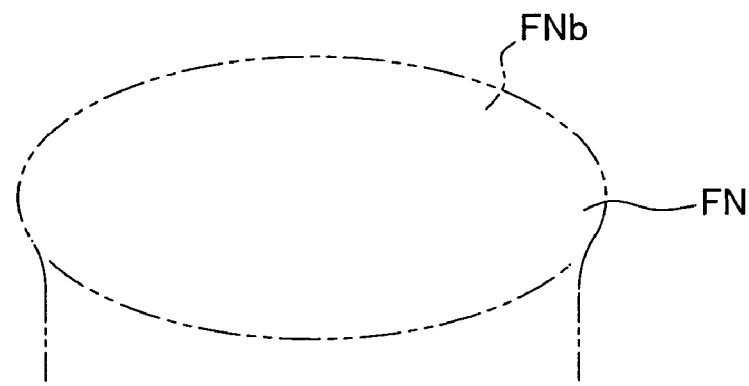
Figure 2:
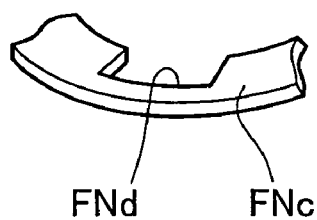

The casing engagement element 20a is formed on a lower portion of the outer circumference of the outer tubular body 21. FIG. 2 shows the casing engagement element 20a of the casing main body 20 relative to the filler neck FN. As shown in FIG. 2, an opening engagement element FNc is formed on the inner circumference of the filler neck FN. Part of the inner circumference of the opening engagement element FNc forms a neck insertion notch FNd, which receives the casing engagement element 20a of the fuel cap 10 inserted therein in an axial direction. The fuel cap 10 is rotated by a preset angle (approximately 90 degrees), after the casing engagement element 20a is positioned at the neck insertion notch FNd and the fuel cap 10 is inserted in the filler neck FN. This rotation of the fuel cap 10 causes the casing engagement element 20a to be caught by the opening engagement element FNc and thereby fixes the fuel cap 10 to the filler neck FN.

As shown in FIG. 1, the flange 21b has an inner ring element 21c formed on the top of the outer tubular body 21, an outer ring element 21d located slightly above and outside the inner ring element 21c, and four joint elements 21e connecting the inner ring element 21c with the outer ring element 21d at four different positions.

(2)-2 Structure of Cover 40

The cover 40 is attached to the flange 21b in a rotatable and freely detachable manner. The cover 40 includes an top wall 41, a handle 42 formed on the top wall 41, and a side wall 43 formed around the top wall 41 and is integrally made of a conductive resin by injection molding. Eight engagement projections (not shown) are protruded inward from the side wall 43 to be arranged at an equal interval along the circumference. The engagement projections engage with the outer ring element 21d of the flange 21b, so that the cover 40 is attached to the casing main body 20. The cover 40 and the handle 42 function as a handle mechanism.

(2)-3 Structure of Torque Mechanism 80

Figure 3:
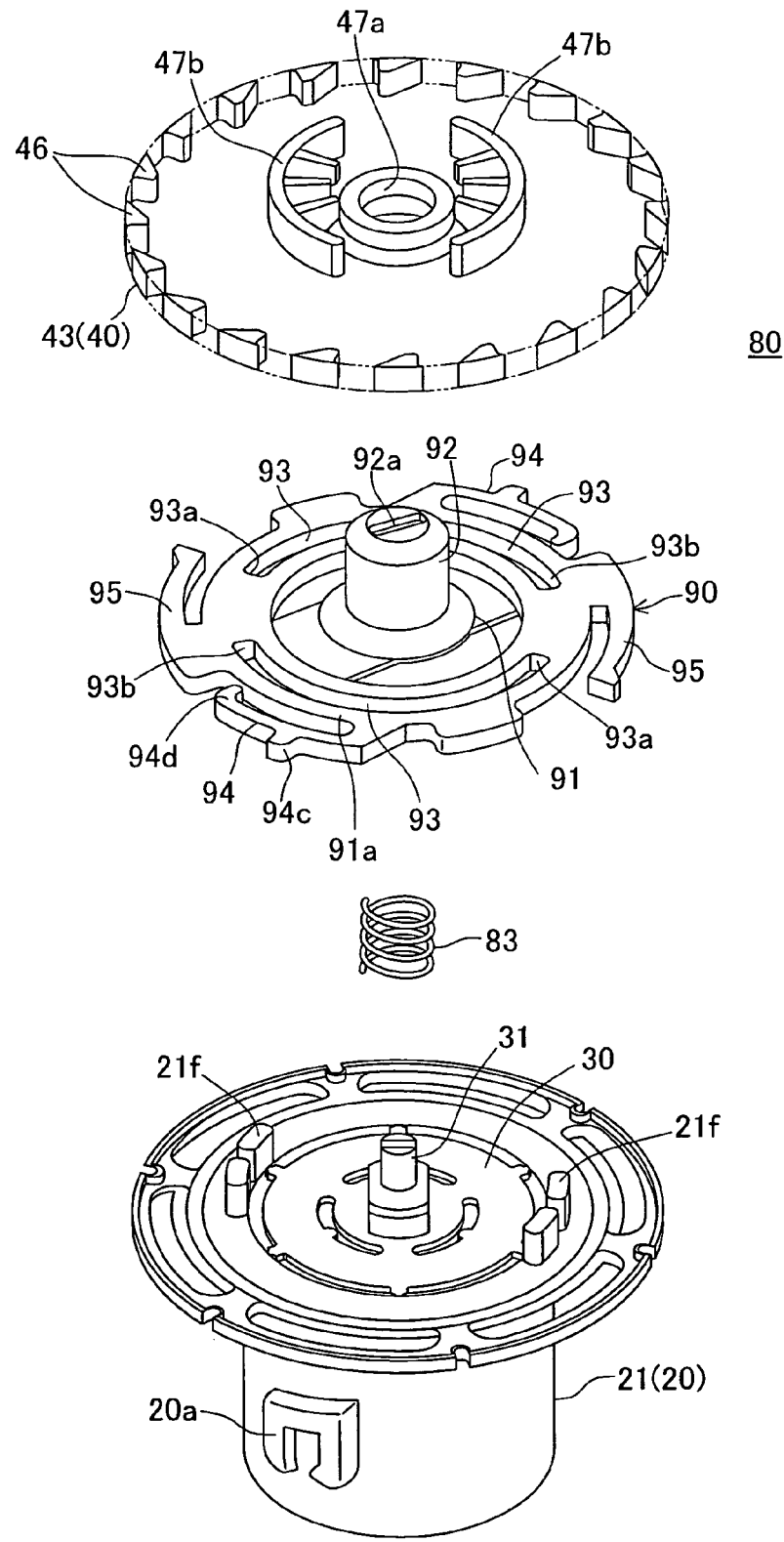
FIG. 3 is a decomposed perspective view showing a torque mechanism located on a cover and an upper portion of the casing main body.
Figure 4:
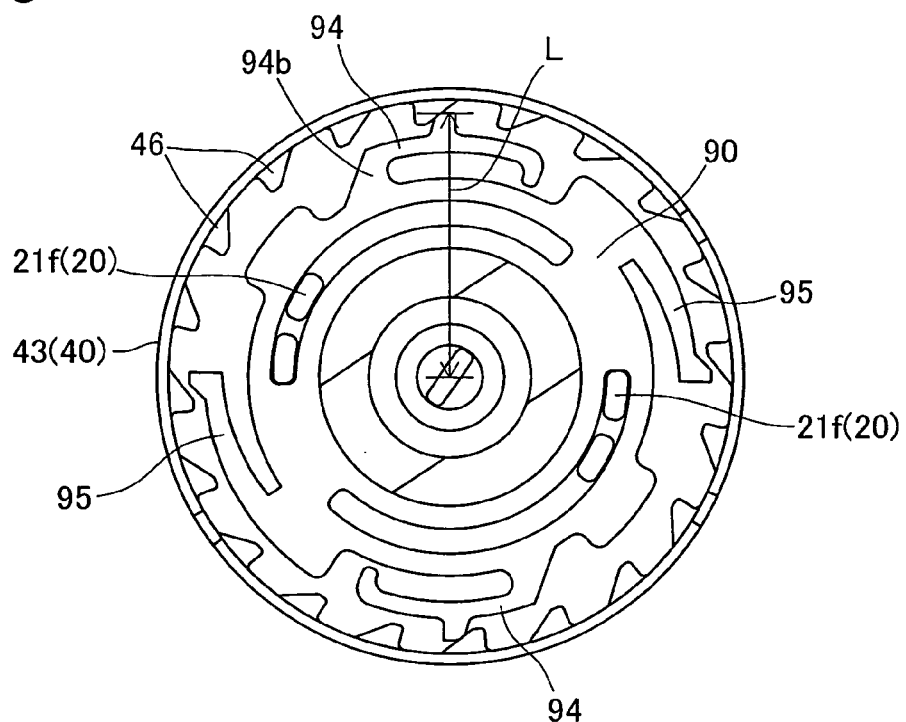
FIG. 4 is a top view of the torque mechanism.

FIG. 3 is a decomposed perspective view showing the torque mechanism 80 located on the cover 40 and the upper portion of the casing main body 20. FIG. 4 is a top view of the torque mechanism 80. The torque mechanism 80 clicks when the cover 40 receives a rotational torque of or over a predetermined level in the closing operation of the fuel cap 10 in the fueling inlet FNb. The user can thus confirm that the fuel cap 10 is attached to the filler neck FN with a rotational torque of or over the predetermined level.

As shown in FIGS. 3 and 4, the torque mechanism 80 includes two split body ribs 21f,21f erected at two opposite positions on the circumference of the outer tubular body 21, handle engagement elements 46 that are protruded inward at an equal interval from the side wall 43 of the cover 40, a spring 83, and a torque plate 90.

Figure 5:
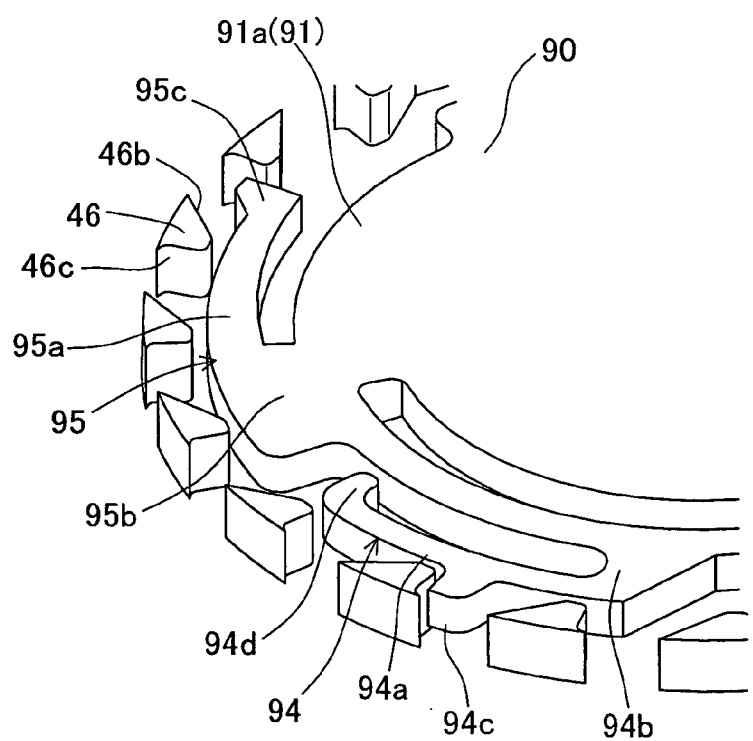
FIG. 5 is a perspective view showing a main part of the torque mechanism.

The handle engagement elements 46 functioning as first engagement elements are protruded at an equal interval around the inner circumference of the side wall 43 of the cover 40. FIG. 5 is an enlarged perspective view showing the main part of FIG. 3. As shown in FIG. 5, each handle engagement element 46 has a first engagement face 46b inclined relative to the radial direction and a second engagement face 46c along the radial direction. Twenty handle engagement elements 46 are disposed with 18 degrees at an interval and are arranged to engage with torque arms of the torque plate 90 as discussed below.

With referring again to FIG. 3, a support hole 47a and a pair of support arcs 47b,47b surrounding the support hole 47a are protruded from the inner face of the cover 40 to support the torque plate 90 in a freely rotatable manner. The pair of support arcs 47b,47b are arranged symmetrically about the rotating axis of the cover 40.

The torque plate 90 is a disc-shaped member made of a resin and has a center projection, guide grooves, and torque arms. A torque main body 91 on the center of the torque plate 90 has an upright, cup-shaped spring-receiving projection 92, which receives the spring 83 therein. The spring 83 is spanned between the torque plate 90 and the inner cover 30 fixed with the casing main body 20 as shown in FIG. 1 to function as a torsion spring. More specifically the spring 83 is spanned between a first spring stop end 92a formed on the top lower wall of the spring-receiving projection 92 and a second spring stop end 31 formed on the upper face of the inner cover 30. The spring 83 twists the torque plate 90 clockwise relative to the casing main body 20 to apply a torsion.

Rib guide grooves 93,93 are formed around the spring-receiving projection 92. The two split body ribs 21f,21f are respectively fit in the rib guide grooves 93,93. Each split body rib 21f is movable back and forth between two pressure ends 93a and 93b of the corresponding rib guide groove 93.

Figure 6:
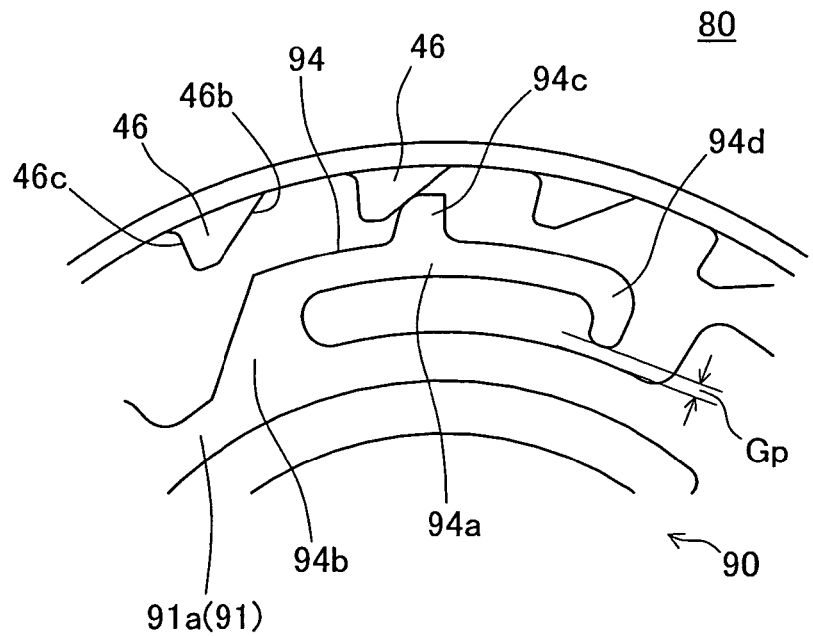
FIG. 6 shows a motion of a first torque arm included in the torque mechanism.
Figure 7:
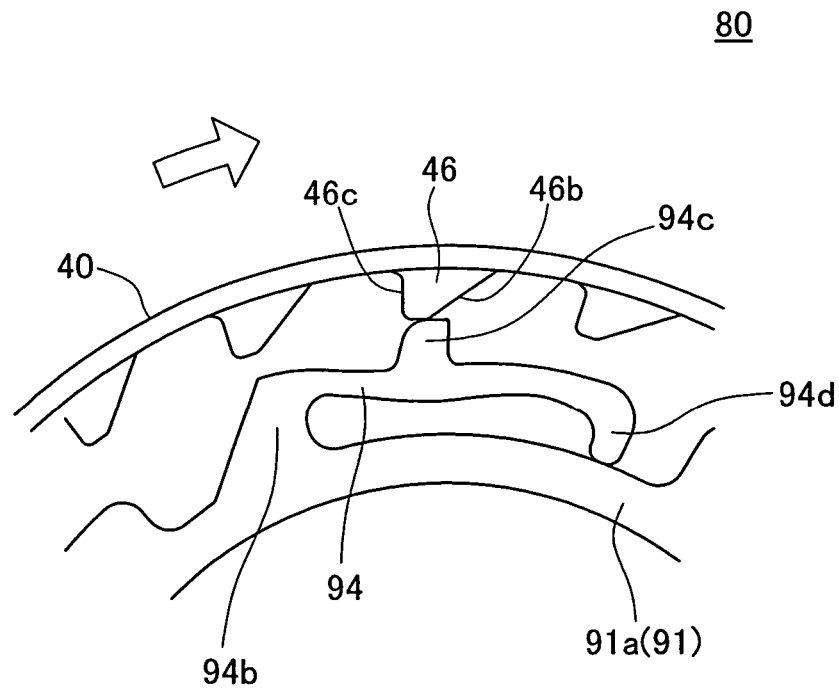
FIG. 7 shows a motion of the torque mechanism subsequent to the state of FIG. 6.

First torque arms 94,94 (second engagement elements) and second torque arms 95,95 (third engagement elements) are formed on an arm support member 91a of the torque plate 90. As shown in FIGS. 5 and 6, each of the first torque arms 94 has an arm main body 94a protruded from the arm support member 91a and a torque engagement projection 94c protruded outward from the arm main body 94a. The first torque arm 94 is a cantilever beam on a support base 94b as the point of support and has a free end 94d arranged to face the torque main body 91 across a preset gap Gp. As shown in FIG. 7, when the first engagement face 46b of the handle engagement element 46 presses the torque engagement projection 94c to have no gap Gp between the free end 94d of the first torque arm 94 and the torque main body 91, the first torque arm 94 is deformed in a direction perpendicular to the longitudinal axis of the first torque arm 94 on the two-point support of the support base 94b and the free end 94d. Rotation of the cover 40 in a closing direction (clockwise) enables the handle engagement element 46 to ride over the torque engagement projection 94c.

Figure 8:
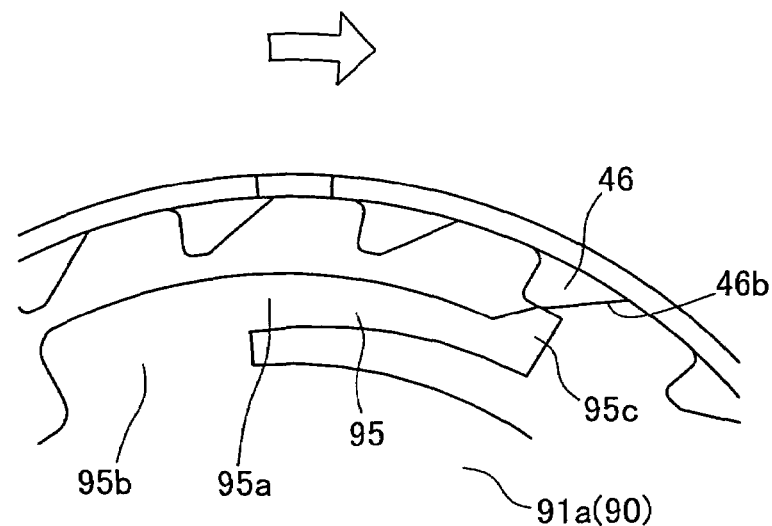
FIG. 8 shows a motion of a second torque arm included in the torque mechanism.
Figure 9:
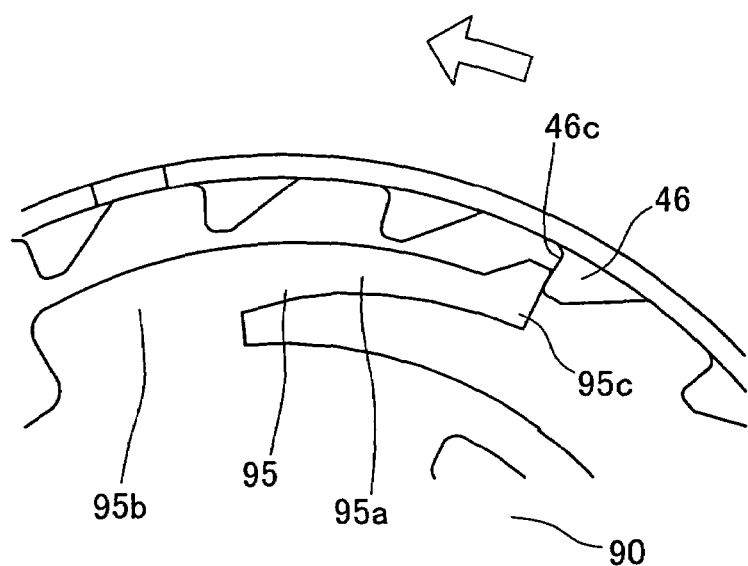
FIG. 9 shows a motion of the toque mechanism subsequent to the state of FIG. 8.
Figure 10:
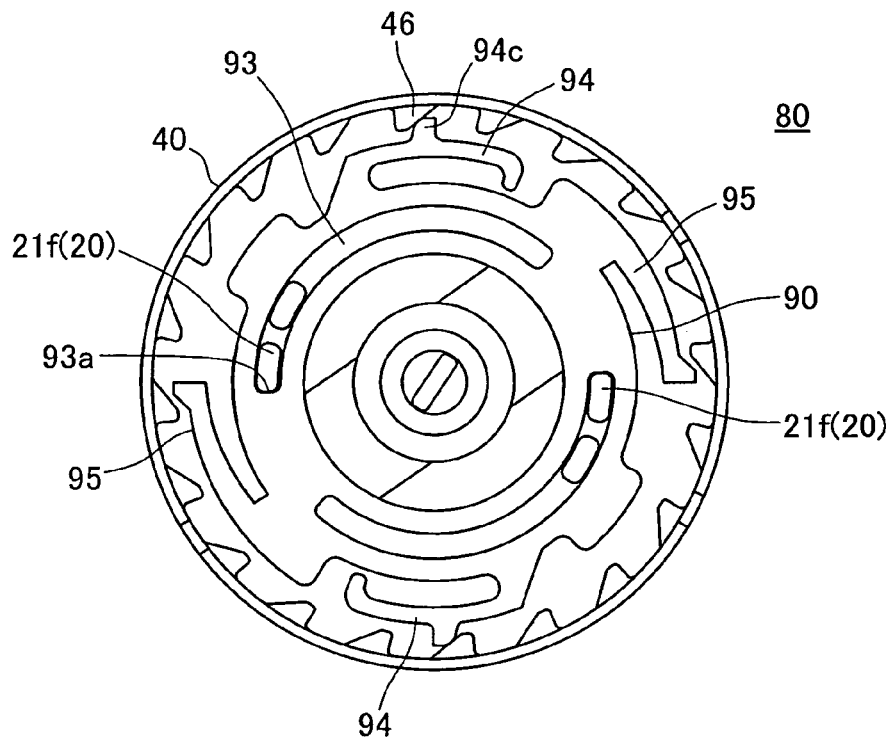
FIG. 10 shows a motion of the torque mechanism.
Figure 11:
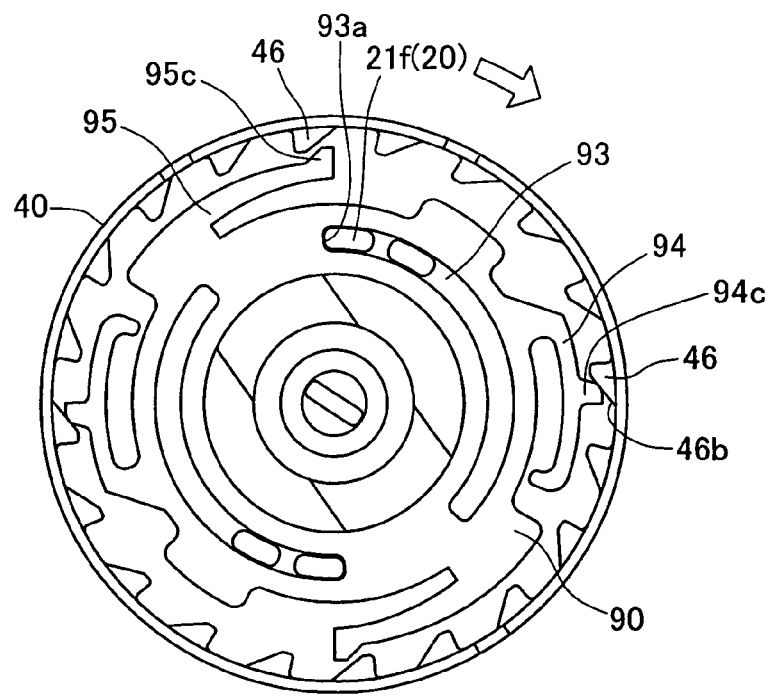
FIG. 11 shows a motion of the torque mechanism subsequent to the state of FIG. 10.

As shown in FIGS. 5 and 8, each of the second torque arms 95 has an arm main body 95a protruded from the arm support member 91a and an engagement end 95c formed on one end of the arm main body 95a. The second torque arm 95 is a cantilever beam on a support base 95b as the point of support. As shown in FIG. 8, when the first engagement face 46b of the handle engagement element 46 presses the engagement end 95c, the second torque arm 95 is inclined inward on the support base 95b as the point of support. The handle engagement element 46 thus readily rides over the engagement end 95c of the second torque arm 95. As shown in FIG. 9, on the other hand, when the second engagement face 46c of the handle engagement element 46 engages with the engagement end 95c, the second torque arm 95 is inclined outward on the support base 95b as the point of support. The handle engagement element 46 does not ride over the engagement end 95c of the second torque arm 95 but rotates integrally with the torque plate 90.

(3) Opening and Closing Operations of Fuel Cap 10

Figure 14:
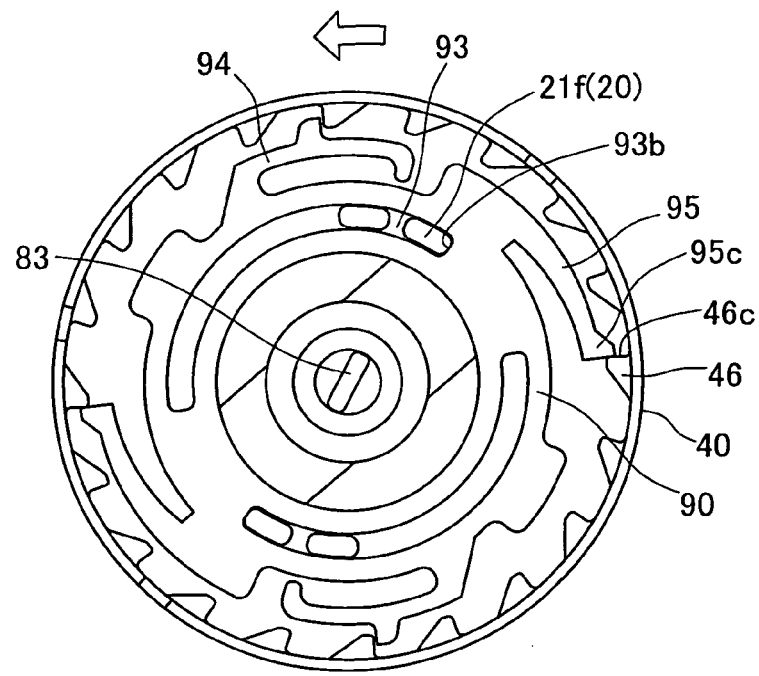
FIG. 14 shows a motion of the torque mechanism subsequent to the state of FIG. 13.
Figure 15:
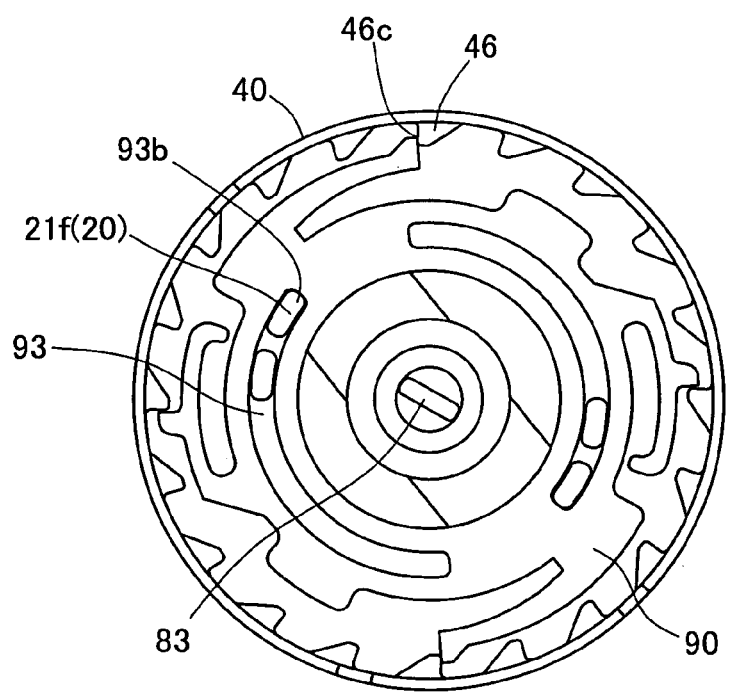
FIG. 15 shows a motion of the torque mechanism subsequent to the state of FIG. 14.

The following describes the functions of the torque mechanism 80 when the fueling inlet FNb of the filler neck FN is opened and closed by the fuel cap 10. FIGS. 10 through 13 show a closing operation of the fuel cap 10. FIGS. 13 through 15 show an opening operation of the fuel cap 10. The torque mechanism 80 has two first torque arms 94,94, two second torque arms 95,95, and two split body ribs 21f,21f arranged about the rotational axis of the torque plate 90, as mentioned above. The torque mechanism 80 accordingly has the symmetrical operations.

(3)-1 Closing Operation of Fuel Cap 10

The user holds the handle 42 of the cover 40 with thumb and index finger, positions the casing engagement element 20a of the casing main body 20 at the neck insertion notch FNd of the filler neck FN, and inserts the casing main body 20 in the axial direction into the fueling inlet FNb. While the handle 42 is arranged in the substantially vertical direction, the casing engagement element 20a is located at the position to be fit in the neck insertion notch FNd. This ensures easy attachment of the fuel cap 10 to the filler neck FN. In the positional relation of the torque mechanism 80 shown in FIG. 10, the pressing force of the spring 83 (see FIG. 1) presses the body rib 21f against the pressure end 93a of the rib guide groove 93.

Figure 12:
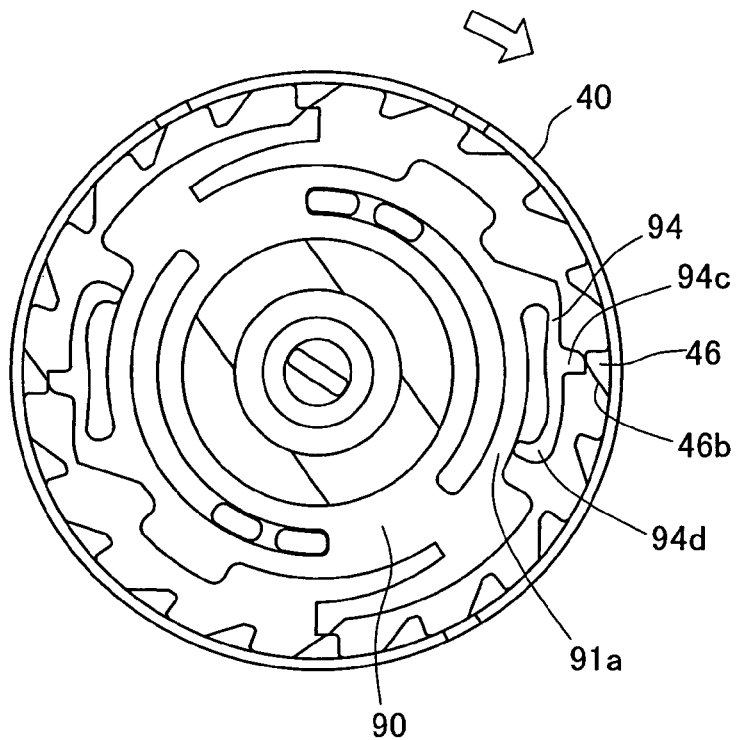
FIG. 12 shows a motion of the torque mechanism subsequent to the state of FIG. 11.
Figure 13:
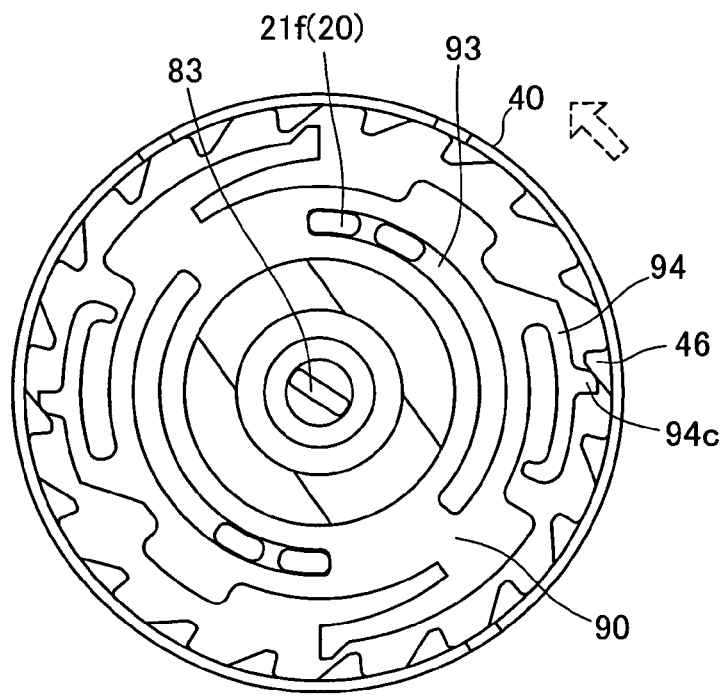
FIG. 13 shows a motion of the torque mechanism subsequent to the state of FIG. 12.

When a clockwise rotational force is applied to the cover 40 for a closing operation, the torque mechanism 80 performs a series of operations as shown in FIGS. 10 to 13. The clockwise rotational force applied to the cover 40 is transmitted to the torque plate 90 via the engagement of the handle engagement element 46 of the cover 40 with the torque engagement projection 94c of the first torque arm 94 to rotate the torque plate 90 clockwise. With the rotation of the torque plate 90, the pressure end 93a of the rib guide groove 93 in the torque plate 90 presses the body rib 21f of the casing main body 20. The cover 40, the torque plate 90, and the casing main body 20 thus rotate integrally in the closing direction of the fueling inlet FNb to enhance the engagement force of the casing engagement element 20a with the opening engagement element FNc (the state of FIG. 11). When the reactive force produced against this engagement force reaches or exceeds a predetermined rotational torque, the handle engagement element 46 rides over the torque engagement projection 94c as shown in FIG. 12 to release the engagement shown in FIG. 13.

The first engagement face 46b of the handle engagement element 46 presses the torque engagement projection 94c of the first torque arm 94 in the radial direction. The first torque arm 94 is thus elastically deformed on the two-point support, that is, in the center-impeller state, to release the engagement. The release of the engagement gives a click. The fuel cap 10 is thus fit in the fueling inlet FNb with some clamping torque to close the fueling inlet FNb. At this time, the engagement end 95c of the second torque arm 95 also engages with the handle engagement element 46 as shown in FIG. 8. The second torque arm 95 is, however, inclined in the radial direction by a significantly small force about the support base 95b and thus has very little contribution to transmission of the rotational torque in the closing direction.

In the state of FIG. 13, the cover 40 and the torque plate 90 are pressed clockwise by means of the spring 83. This pressing force enables a lost motion of the cover 40 and the torque plate 90 in the moving range of the body rib 21f along the rib guide groove 93 in the opening direction. Even in the case where an external force is applied in the opening direction to the cover 40, for example, due to a collision, this arrangement does not rotate the casing main body 20 to ensure the sufficient sealing properties, while allowing for rotation of the cover 40 and the torque plate 90.

(3)-2 Opening Operation of Fuel Cap 10

In order to open the fuel cap 10, the user holds the handle 42 of the cover 40 with thumb and index finger and applies a counterclockwise rotational force to the handle 42 from the state of FIG. 13. The second engagement face 46c of the handle engagement element 46 then presses the engagement end 95c of the second torque arm 95 as shown in FIG. 14. The torque plate 90 accordingly rotates with the cover 40. In this state, the first torque arm 94 does not engage with the handle engagement element 46 at all or engages with the handle engagement element 46 with a significantly smaller engagement force than that of the second torque arm 95. The first torque arm 94 thus has very little contribution to transmission of the rotational torque in the opening direction.

Since in this state, the casing main body 20 is fit in and caught by the filler neck FN, only the cover 40 and the torque plate 90 rotate counterclockwise against the pressing force of the spring 83 (from the state of FIG. 13 to the state of FIG. 14). This counterclockwise direction moves the body rib 21f along the rib guide groove 93 toward the pressure end 93b.

The spring 83 is then twisted to enhance the rotational torque. When the enhanced rotational torque exceeds the reactive force of restraining the motion of the casing main body 20 or when the body rib 21f reaches the pressure end 93b of the rib guide groove 93 under the condition of the rotational torque not exceeding the reactive force, the rotational force applied to the cover 40 is transmitted to the casing main body 20 via the handle engagement element 46, the torque plate 90, the pressure end 93b, and the body rib 21f The cover 40, the torque plate 90, and the casing main body 20 thus rotate integrally counterclockwise.

Rotation of the casing main body 20 with the cover 40 by approximately 90 degrees (the state of FIG. 15) releases the engagement of the casing engagement element 20a with the opening engagement element FNc of the filler neck FN. The casing main body 20 is thus free from the restraint of the filler neck FN. In this state, the pressing force of the spring 83 is applied to the casing main body 20 and the torque plate 90, while the user holds the cover 40 with thumb and index finger. The casing main body 20 thus rotates clockwise relative to the cover 40 and the torque plate 90 to be returned to the first position (the state of FIG. 10). Namely the positional relation among the cover 40, the torque plate 90, and the casing main body 20 is restored to the initial state.

(4) Effects of Embodiment

The structure of the embodiment has the following effects, in addition to those discussed above.

(4)-1 Since in the closing operation of the fuel cap 10, the torque plate 90 clicks when the handle engagement elements 46 of the cover 40 ride over the torque engagement projections 94c of the torque plate 90, the user can thus confirm clamping of the fuel cap 10 with a predetermined level of torque. This structure enables the fuel cap 10 to be clamped with the predetermined level of torque, regardless of the elasticity of the gasket GS.

(4)-2 Since the fuel cap 10 is operated by a small rotational angle of about 90 degrees via the engagement of the casing engagement element 20a with the opening engagement element FNc, this structure does not require many rotating operations and thus facilitates the attachment of the fuel cap 10 to the filler neck FN.

(4)-3 Since when the cover 40 is rotated counterclockwise to open the fuel cap 10, the pressing force of the spring 83 included in the torque mechanism 80 restores the positional relation among the cover 40, the torque plate 90, and the casing main body 20 to the initial state, the fuel cap 10 is detachable from the filler neck FN.

(4)-4 The fuel cap 10 uses the two types of torque arms having different shapes, that is, the first torque arms 94 and the second torque arms 95. This structure lowers the contact pressure of the torque engagement projections 94c of the first torque arms 94, so as to reduce abrasion of the torque engagement projections 94c and enhance the durability of the first torque arms 94.

A rotational torque T is expressed as T=P·L, where L denotes the distance between the rotational axis and the first torque arm 94 as shown in FIG. 4 and P denotes a stress applied from the handle engagement element 46 to the first torque arm 94. When it is assumed that the stress P is a deformation stress Pa applied to the first torque arm 94 at the moment of release, a predetermined rotational torque Ta at the moment of release is expressed as Ta=Pa·L. The method of increasing the distance L and reducing the deformation stress Pa applied to the first torque arm 94 under the condition of the fixed rotational torque Ta lowers the contact pressure of the torque engagement projection 94c of the first torque arm 94.

The reduction of the deformation stress Pa lowers the mechanical strength at the base of the first torque arm 94. The lowered mechanical strength at the base of the first torque arm 94 makes the support base 94b of the first torque arm 94 susceptible to damage by repeated application of large rotational torques in the opening direction. One possible countermeasure increases the number of the first torque arms 94 and reduces the rotational torque applied in the closing direction to each of the first torque arms 94. This possible structure, however, has difficulty in setting the rotational torque in the opening direction and can not prevent the damage of the first torque arm 94 at the support base 94b.

The second torque arms 95 are accordingly formed to share the rotational torque in the opening direction and thereby prevent the first torque arms 94 from receiving a significantly large load in the opening direction. This structure effectively enhances the durability of the first torque arms 94. The second torque arms 95, on the other hand, do not have much load in the closing direction, but the first torque arms 94 mainly receive the rotational torque Ta in the closing direction. This structure facilitates setting of the load at the moment of release.

(4)-5 As shown in FIGS. 6 and 7, the handle engagement element 46 of the cover 40 engages with the torque engagement projection 94c of the first torque arm 94. The first torque arm 94 is pressed by the handle engagement element 46 to have no gap Gp between the free end 94d and the torque main body 91 and to be held by the two-point support. The first torque arm 94 is elastically deformed in the direction perpendicular to its longitudinal axis and transmits the rotational torque applied to the handle mechanism to the casing main body 20. The rotational torque to be transmitted is set by taking into account the required force to elastically deform the first torque arm 94 in the direction perpendicular to its longitudinal axis at the two-point support where the free end 94d of the first torque arm 94 is in contact with the torque main body 91 and to make the handle engagement element 46 ride over the torque engagement projection 94c. The rotational torque is set to a predetermined level, regardless of the varying gap Gp between the free end 94d of the first torque arm 94 and the torque main body 91 in the molded torque plate 90. Since the rotational torque under release of the engagement does not depend upon the gap Gp between the free end 94d of the first torque arm 94 and the torque main body 91, the rotational torque under release of the engagement can be set to the predetermined level, regardless of the varying dimensions of the first torque arm 94.

(4)-6 Since the free end 94d of the first torque arm 94 is chamfered, the free end 94d comes into contact with and is slid on the torque main body 91, when the first torque arm 94 is elastically deformed. This structure ensures smooth elastic deformation of the first torque arms 94.

The embodiment discussed above is to be considered in all aspects as illustrative and not restrictive. There may be many modifications, changes, and alterations without departing from the scope or spirit of the main characteristics of the present invention. Some examples of possible modification are given below.

Figure 16:
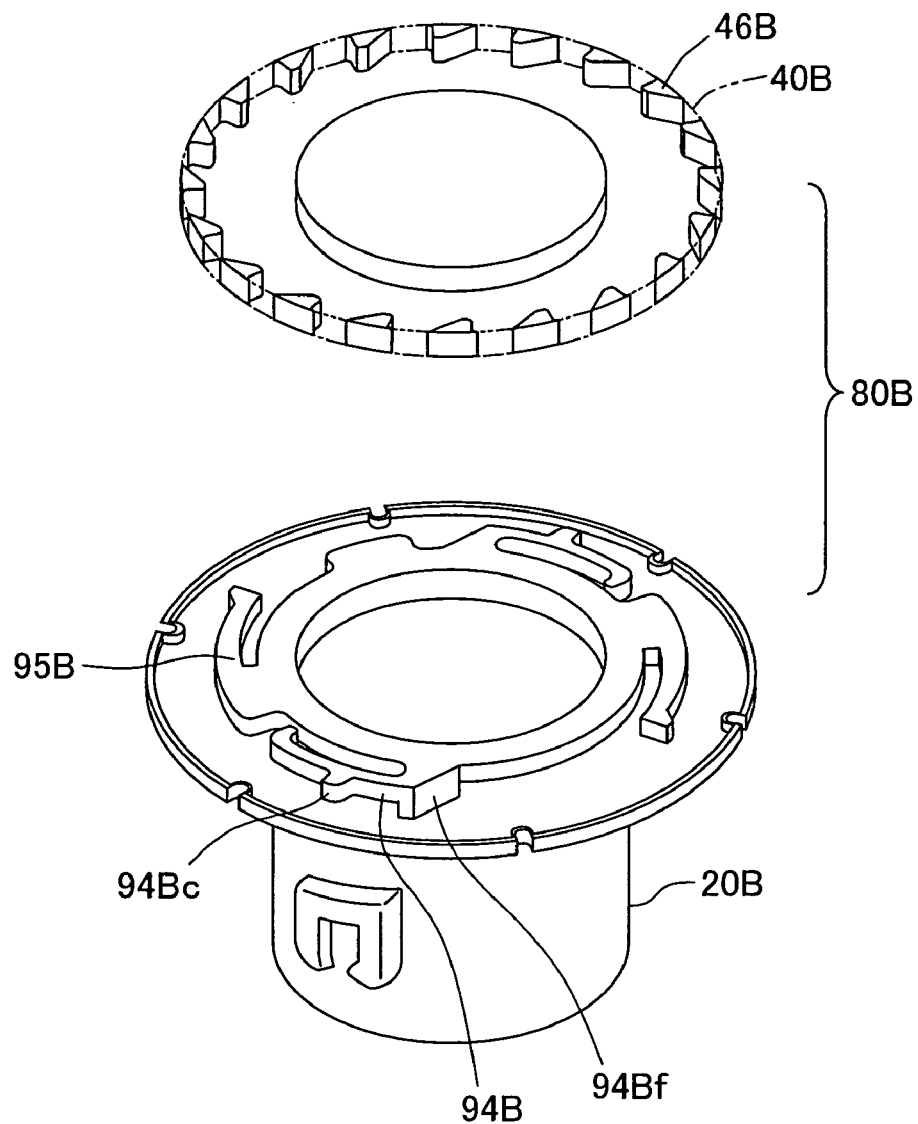
FIG. 16 is a decomposed perspective view showing a fuel cap in one modified example.
Figure 17:
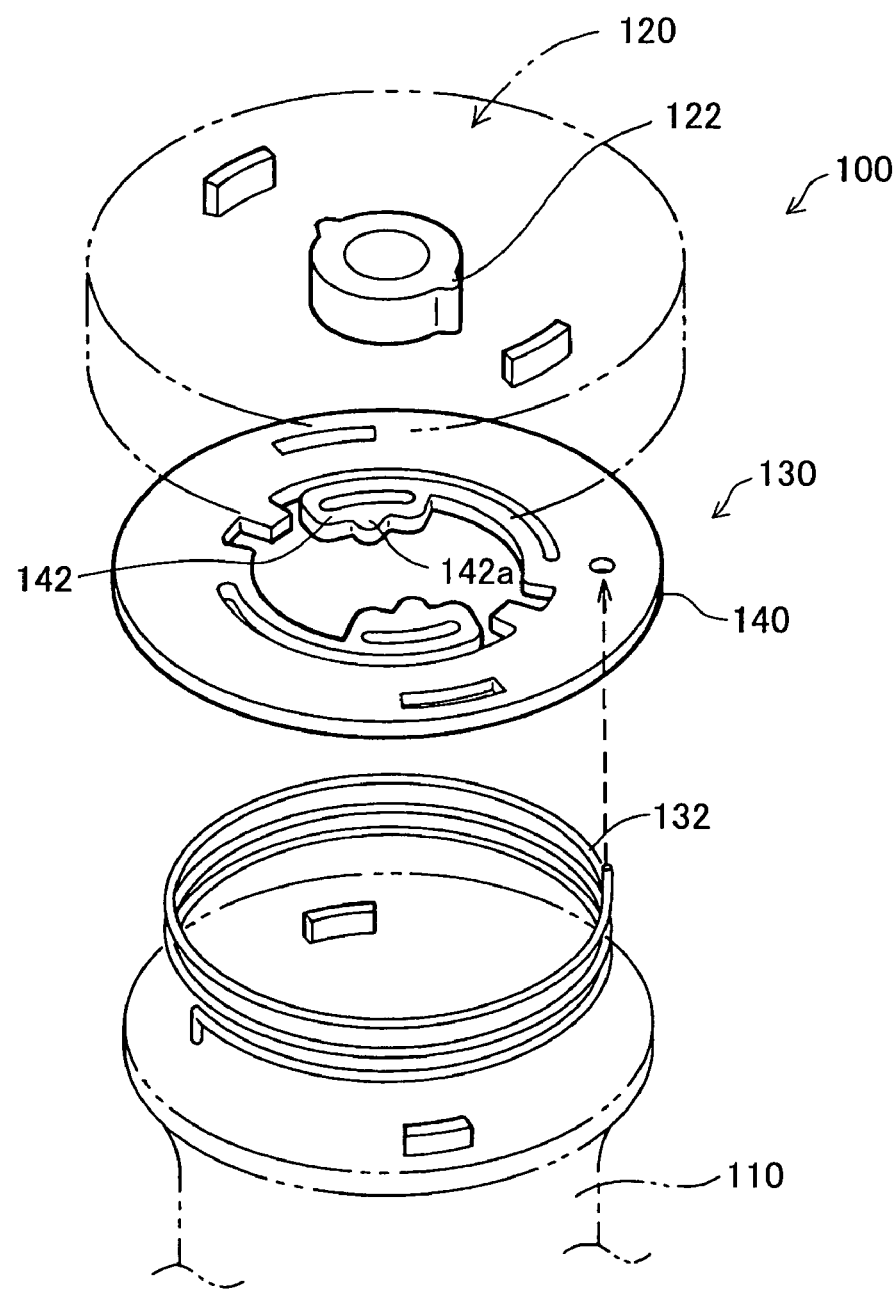
FIG. 17 is a decomposed perspective view showing a prior art torque mechanism of a conventional fuel cap.

(1) FIG. 16 is a decomposed perspective view showing a fuel cap in one modified example. In the fuel cap of this modified example, first torque arms 94B and second torque arms 95B included as part of a torque mechanism 80B are integrally formed with a casing main body 20B. The first torque arms 94B,94B and second torque arms 95B,95B are integrally formed with the top face of the casing main body 20B. Each of the first torque arms 94B,94B has a leg 94Bf erected from the top face of the casing main body 20B and is extended from an upper portion of the leg 94Bf in the circumferential direction to have a preset gap from the top face of the casing main body 20B. Each of the second torque arms 95B,95B is arranged between the first torque arms 94B,94B.

In the fuel cap of this modified example, integral formation of the first torque arms 94B,94B and the second torque arms 95B,95B of the torque mechanism 80B with the casing main body 20B desirably reduces the required number of parts. A handle engagement element 46B is in contact with a torque engagement projection 94Bc with a small angle in the closing direction, after riding over the torque engagement projection 94Bc. This modified structure allows for integral rotation of a cover 40B with the casing main body 20B and eliminates the lost motion discussed above with reference to FIG. 13, thus reducing the operation angle for returning the cover 40B.

(2) In the structure of the embodiment discussed above, the first engagement elements are the handle engagement elements formed on the cover. This is, however, not restrictive at all. The first engagement elements may be arranged on the casing main body and the torque arms may be arranged on the cover, as long as the smooth operations of the torque mechanism are assured.

All changes within the meaning and range of equivalency of the claims are intended to be embraced therein. The scope and spirit of the present invention are indicated by the appended claims, rather than by the foregoing description.

What is claimed is:

1. A cap device that closes a tank opening and engages with an opening engagement element formed around periphery of the tank opening, the cap device comprising:

a closer that closes the tank opening with air-tight sealing and has a cap engagement element engaging with the opening engagement element via rotation of the closer by a preset angle;

a handle mechanism that is mounted on an upper portion of the closer in a rotatable manner to rotate the closer in a closing direction and an opening direction of the tank opening; and a torque mechanism that is interposed between the handle mechanism and the closer, the torque mechanism having (i) a first engagement element, and (ii) a second engagement element engaging with the first engagement element, the torque mechanism being configured to transmit a rotational torque applied to the handle mechanism to the closer via engagement of the first engagement element with the second engagement element, wherein the second engagement element includes an arm support member and a torque arm protruded from the arm support member, the torque arm having (i) an arm main body that is protruded from the arm support member and is structured as a cantilever beam with a free end arranged to face the arm support member across a preset gap, and (ii) a torque engagement projection that is protruded from the arm main body to engage with the first engagement element, the torque arm being configured to be deformed in a direction perpendicular to a longitudinal axis of the torque arm at a two-point support where the free end is in contact with the arm support member, and to transmit the rotational torque in the closing direction applied from the handle mechanism to the closer, before the engagement of the first engagement element with the torque engagement projection is released not to transmit the rotational torque to the closer when the rotational torque exceeds a predetermined level, the torque mechanism has a torque plate held between the handle mechanism and the closer in a freely rotatable manner, and the torque arm is protruded from an outer circumference of the torque plate, the torque mechanism further comprises a third engagement element that is a torque arm that is constructed as a cantilever beam, and engages with the first engagement element to transmit a greater rotational torque in the opening direction than the engagement of the first engagement element with the second engagement element in response to a rotation of the handle mechanism in the opening direction, and the third engagement element has an engagement end at an end of the cantilever beam, the torque arm of the third engagement element being inclined at a one-point support of a base of the torque arm under application of pressure from the first engagement element to the engagement end.

2. The cap device in accordance with claim 1, wherein the handle mechanism includes a cover surrounding an upper portion of the closer and a handle mounted on the cover, and the first engagement element has multiple handle engagement elements arranged on a circumference of the cover to face the closer.

3. A cap device that closes a tank opening and engages with an opening engagement element formed around periphery of the tank opening, the cap device comprising:

a closer that closes the tank opening with air-tight sealing and has a cap engagement element engaging with the opening engagement element via rotation of the closer by a preset angle;

a handle mechanism that is mounted on an upper portion of the closer in a rotatable manner to rotate the closer in a closing direction and an opening direction of the tank opening;

a torque mechanism that is interposed between the handle mechanism and the closer, the torque mechanism having (i) a first engagement element, and (ii) a second engagement element engaging with the first engagement element, the torque mechanism being configured to transmit a rotational torque applied to the handle mechanism to the closer via engagement of the first engagement element with the second engagement element, wherein the second engagement element includes an arm support member and a torque arm protruded from the arm support member, the torque arm having (i) an arm main body that is protruded from the arm support member and is structured as a cantilever beam with a free end arranged to face the arm support member across a preset gap, and (ii) a torque engagement projection that is protruded from the arm main body to engage with the first engagement element, the torque arm being configured to be deformed in a direction perpendicular to a longitudinal axis of the torque arm at a two-point support where the free end is in contact with the arm support member, and to transmit the rotational torque in the closing direction applied from the handle mechanism to the closer, before the engagement of the first engagement element with the torque engagement projection is released not to transmit the rotational torque to the closer when the rotational torque exceeds a predetermined level, the torque arm is protruded from an upper portion of the closer, the torque mechanism further comprises a third engagement element that is a torque arm that is constructed as a cantilever beam, and engages with the first engagement element to transmit a greater rotational torque in the opening direction than the engagement of the first engagement element with the second engagement element in response to a rotation of the handle mechanism in the opening direction, and the third engagement element has an engagement end at an end of the cantilever beam, the torque arm of the third engagement element being inclined at a one-point support of a base of the torque arm under application of pressure from the first engagement element to the engagement end.

4. The cap device in accordance with claim 3, wherein the handle mechanism includes a cover surrounding the upper portion of the closer and a handle mounted on the cover, and the first engagement element is formed by multiple handle engagement elements arranged on a circumference of the cover to face the closer.

* * * * *